United States Patent [19]

Austin

[11] 3,879,377

[45] Apr. 22, 1975

[54] PURIFICATION OF CHITIN
[75] Inventor: Paul Rolland Austin, Wilmington, Del.
[73] Assignee: The University of Delaware, Newark, Del.
[22] Filed: Nov. 23, 1973
[21] Appl. No.: 418,287

[52] U.S. Cl. ............................... 260/211 R; 424/180
[51] Int. Cl. ............................................. C07c 97/04
[58] Field of Search ................................. 260/211 R

[56] References Cited
UNITED STATES PATENTS
2,783,148  2/1957  György et al. ................... 260/211 R
3,089,821  5/1963  Folkers ........................... 260/211 R Primary Examiner—Johnnie R. Brown
Assistant Examiner—Cary B. Owens

[57] ABSTRACT

New solvents for chitin have been discovered comprising a 1, 2-chloroalcohol in admixture with an acidic solvent, particularly a mineral acid, and a method for purifying the chitin and regenerating it from solution in the form of powdered chitin and/or crystalline fibrils.

7 Claims, No Drawings

PURIFICATION OF CHITIN

Chitin is an aminocellulose derivative that occurs widely in nature, for example, in the cell walls of fungi, bovine cartilage, cuttlefish bone and the hard shell of insects and crustaceans. The waste from shrimp, lobster and crab seafood industries contains 10–15 percent chitin and is a potentially important source of chitin, although the isolation and purification of the chitin, associated therein with mineral components, protein and other ingredients, presents considerable difficulty.

The applications for chitin are not extensive, in part because it has been little investigated and in part because it is difficult to purify. The use of chitin for accelerating and promoting wound healing is described in U.S. Pat. No. 3,632,754, to L. L. Balassa, Jan. 4, 1972. In other literature, the difficulties of purification are mentioned frequently. Chitin is also employed in the manufacture of chitosan, a deacetylated chitin that is readily soluble in dilute acids and may find application in paper making and surface active agents, for example.

More specifically, chitin is a mucopolysaccharide, believed to be poly-N-acetyl-D-glucosamine, with an empirical formula of $(C_8H_{12}O_5N)_n$ in which $n$ may be any number into the thousand range, but is commonly in the area of 100–1000. Chitin is a generally intractable material, soluble only in strong mineral acids, lithium thiocyanate solutions, and other special concentrated salt solutions, most of which cause disintegration or rapid degredation with loss in molecular weight or hydrolysis of the acetyl groups or both.

Accordingly, it is an object of this invention to provide a method for preparing solutions of chitin that can be filtered, centrifuged, otherwise purified or processed.

Another object is to prepare solutions containing as much as 5–10 percent or more chitin at workable viscosity. A related aspect is to provide lower viscosity solutions in the normal 1–3 percent range of chitin concentration.

A further purpose of the invention is to provide a method for the regeneration of chitin in purified form. The purified chitin is itself an object of the invention.

Still another aspect of the invention is to provide a method for the preparation of chitin in the form of crystalline fibrils, such fibrils being themselves an object of the invention.

It has been found that 1, 2-chloroalcohols in conjunction with aqueous solutions of mineral acids or with certain lower molecular weight organic acids are effective systems for dissolving chitin in any form, such as native, reprecipitated powders, or crystalline conformations. Said solvent systems give relatively low viscosity solutions of chitin, they dissolve chitin rapidly at room or mildly elevated temperature and hydrolytic degredation proceeds relatively slowly in them.

1, 2-chloroalcohols that may be employed include 2-chlorethanol, 1-chloro-2-propanol, 2-chloro-1-propanol, and 3-chloro-1,2-propandeiol. Certain of these materials are also called chlorhydrins and a commercial mixture of propylene chlorhydrins comprising 1-chloro-2-propanol and 2-chloro-1-propanol may be conveniently employed. However, the simple 2-chlorethanol is generally preferred. This class of alcohols is surprisingly effective as solvent adjuncts for chitin, in the light of the strong precipitant action of other alcohols, such as methanol, ethanol and 2-propanol.

The commercial mineral acids are the best known solvents for chitin except that sulfuric acid must be diluted somewhat to avoid charring. The preferred systems are as follows:

| Acid | Concentration, % |
| --- | --- |
| HCl | 37 |
| $HNO_3$ | 45–70 |
| $H_2SO_4$ | 58–85 |
| $H_3PO_4$ | 58 |

The choice among these solvents is always a compromise among such aspects as rate of solution, rate of chitin degradation, viscosity of the acid and viscosity of the resultant chitin solutions. Similarly, mixtures of 2-chloroethanol with any of these acids have their several compromise properties. However, they all apparently have a reduced degree of ionization of the acid in the chloroalcohol, which leads to a greater stability of the chitin in such solutions. With formic acid solutions of chitin a limited amount of chloroalcohol may be used.

In the practice of this invention it is preferred to use 2-chloroethanol in conjunction with aqueous sulfuric acid, which appears to facilitate solution of the chitin, and gives high chitin concentrations at workable viscosities, a low rate of hydrolysis and the ability to precipitate chitin therefrom in crystalline fibrilar form.

EXAMPLE 1

One part of chitin, 12 parts of 2-chloroethanol and 16 parts of 73 percent sulfuric acid were mixed together and heated moderately below the boiling point of the 2-chloroethanol; the chitin dissolved readily to give a relatively low viscosity solution. The chitin could be precipitated by addition of water, methanol or aqueous ammonium hydroxide.

EXAMPLE 2

One part of chitin, 6 parts of 2-chloroethanol and 8 parts of 73 percent sulfuric acid were shaken intermittently for 8 hours. The syrupy solution was filtered through a 30 mesh stainless steel sieve to remove undissolved particles and non-chitinous material and the solution poured with stirring into an excess of aqueous ammonia to neutralize the acid, precipitate the chitin and stabilize it against acid hydrolysis.

The precipitated chitin settled somewhat on standing and was filtered, washed successively with methanol (twice), acetone (twice) and dried, taking care to work the filter cake to facilitate drying and to avoid agglomeration. An 82 percent yield of purified chitin was obtained, partly as a powdery material and partly as fibrils, together with a small amount of a horny fraction. The fibrils collected as a fuzzy ball, visible to the naked eye. Seen under a 50-power microscope, individual fibrils were as long as 1.6 mm with a diameter of 0.02 mm, or an axial ratio of 80:1.

EXAMPLE 3

One part of chitin, 6 parts of 2-chloroethanol and 6 parts of 37 percent hydrochloric acid were stirred together at room temperature and formed a lightcolored viscous solution. After 2 hours, the chitin was precipitated by pouring the solution into acetone, the chitin filtered and washed several times with acetone and dried. The recovery was about 20 percent.

EXAMPLE 4

In a series of tests, one part of chitin was mixed, with mild heating, with a. 11 parts of 1-chloro-2-propanol (containing 25 percent 2-chloro-1-propanol) and 16 parts of 73 percent sulfuric acid
b. 11 parts of 1-chloro-2-propanol (containing 25 percent 2-chloro-1-propanol) and 12 parts of 37 percent hydrochloric acid
c. 13 parts of 2-chloro-1,2-propanediol and 16 parts of 73 percent sulfuric acid
d. 13 parts of 3-chloro-1,2-propanediol and 12 parts of 37 percent hydrochloric acid.

In each case solution proceeded slowly, but incompletely as a portion of the chitin remained undissolved; the 1-chloro-2-propanol mixture, however, appeared superior to the diol.

EXAMPLE 5

One lot of regenerated chitin was prepared substantially as in Example 2, except that the original chitin was pretreated several hours with 3 percent hydrogen peroxide to decolorize and swell it, and the solution process required only 3 hours. The regenerated chitin was a mixture of powder and fibrils as in Example 2. The powdery chitin was observed to have a density of 1.46, while the crystalline fibrils had a density of 1.48. The product mixture was placed in 58 percent sulfuric acid, at room temperature, which dissolved the powdery chitin fraction completely and left the fibrils suspended in the acid solution.

While particular examples of the present invention have been shown and described it is apparent that changes and modifications may be made therein without departing from the invention in its broader aspects. The aim of the appended claims, therefore, is to cover all such changes and modifications as fall within the true spirit and scope of the invention.

I claim:

1. A solution of chitin in a mixture of a 1,2-chloroalcohol with an aqueous solution of a strong inorganic acid or with an organic acid having one or two carbon atoms.

2. The solution of claim 1, wherein the 1,2-chloroalcohol is a mixture of 1-chloro-2-propanol and 2-chloro-1-propanol.

3. The solution of claim 1, wherein the 1,2-chloroalcohol is 2-chloroethanol.

4. A process for purifying chitin which consists essentially of forming a solution of chitin in a solvent consisting essentially of a 1,2-chloroalcohol and a strong inorganic acid or an organic acid having one or two carbon atoms, at a moderate temperature below 129°C for a period of 8 hours or less, separating the undissolved material from the solution to remove the undissolved material and diluting the solution with a miscible non-solvent for the chitin to precipitate the chitin from solution to form crystalline fibrils of chitin.

5. The process of claim 4, wherein the chitin is precipitated by addition of water, methanol or aqueous ammonium hydroxide.

6. The solution of claim 1 wherein the inorganic acid is 58–85 percent sulfuric acid.

7. The process of claim 4 wherein the miscible non-solvent is acetone.

* * * * *